United States Patent
De Lemos Junior (10) Patent No.: US 11,365,836 B2
(45) Date of Patent: Jun. 21, 2022

(54) ASSEMBLING FLANGED COUPLINGS

(71) Applicant: Subsea 7 do Brasil Servicos Ltda, Niteroi (BR)

(72) Inventor: Luiz Carlos De Lemos Junior, Rio de Janeiro (BR)

(73) Assignee: Subsea 7 do Brasil Servicos Ltda, Niteroi (BR)

( * ) Notice: Subject to any disclaimer, the term of this patent is extended or adjusted under 35 U.S.C. 154(b) by 191 days.

(21) Appl. No.: 16/337,892

(22) PCT Filed: Sep. 27, 2017

(86) PCT No.: PCT/BR2017/050284
§ 371 (c)(1),
(2) Date: Mar. 28, 2019

(87) PCT Pub. No.: WO2018/058220
PCT Pub. Date: Apr. 5, 2018

(65) Prior Publication Data
US 2020/0025317 A1    Jan. 23, 2020

(30) Foreign Application Priority Data
Sep. 29, 2016 (GB) .................................... 1616585

(51) Int. Cl.
*F16L 1/09*        (2006.01)
*F16L 23/02*      (2006.01)
(Continued)

(52) U.S. Cl.
CPC .............. *F16L 23/003* (2013.01); *F16L 1/10* (2013.01); *F16L 23/02* (2013.01); *F16L 1/26* (2013.01)

(58) Field of Classification Search
CPC ... Y10T 29/53917; F16L 23/02; F16L 23/036; F16L 1/09; F16L 1/10; B25B 27/14; B25B 27/16; B23P 19/061
(Continued)

(56) References Cited

U.S. PATENT DOCUMENTS 3,144,261 A    8/1964 Stephens
3,257,714 A *   6/1966 Dake ......................... F16L 1/09
                                                     29/237
(Continued)

FOREIGN PATENT DOCUMENTS

CN          101598246      12/2009
GB          2 027 507       2/1980
(Continued)

OTHER PUBLICATIONS

American Petroleum Institute, API Specification 6A, 20th ed. (2010).

*Primary Examiner* — Sunil Singh
(74) *Attorney, Agent, or Firm* — Levy & Grandinetti (57) ABSTRACT

A pulling and alignment system for flanged components has pairs of flange attachments fixed to respective flanges of components that are to be pulled together and aligned for coupling. A puller device is supported by a flange attachment of each pair. A flexible elongate pulling link extends between the flange attachments of the pair and is engaged by, and movable relative to, the puller device to act in tension between those flange attachments. Each flange attachment is a flange extension that comprises an arm cantilevered from a mounting to extend beyond the flange and to hold the pulling link outboard of the flange. The pulling link is an articulated rod having a longitudinal series of rigid elements, each of those elements being pivotably coupled to at least one other of those elements.

32 Claims, 9 Drawing Sheets

(51) Int. Cl.
    *F16L 23/00* (2006.01)
    *F16L 1/10* (2006.01)
    *F16L 1/26* (2006.01)

(58) Field of Classification Search
    USPC ............ 29/271, 272, 464, 467, 525.02, 252;
                                                  285/368, 412
    See application file for complete search history.

(56) References Cited

U.S. PATENT DOCUMENTS

| | | | | |
|---|---|---|---|---|
| 3,638,294 | A | * | 2/1972 | Durant .................. B25B 27/026 |
| | | | | 29/252 |
| 3,658,366 | A | | 4/1972 | Welch, Jr. |
| 4,150,477 | A | * | 4/1979 | Orr ........................ B25B 27/16 |
| | | | | 29/525.08 |
| 6,997,645 | B2 | | 2/2006 | von Trepka et al. |
| 2011/0229270 | A1 | | 9/2011 | Rios |
| 2014/0333067 | A1 | | 11/2014 | Okabe et al. |
| 2016/0039076 | A1 | | 2/2016 | Voss |

FOREIGN PATENT DOCUMENTS

| | | |
|---|---|---|
| GB | 2469933 | 11/2010 |
| WO | WO 03/040602 | 5/2003 |

\* cited by examiner

ASSEMBLING FLANGED COUPLINGS

BACKGROUND OF THE INVENTION

This invention relates to the assembly of flanged couplings or joints between separate parts, such as lengths of pipe to be joined end-to-end.

Flanged couplings are widely used in the offshore oil and gas industry to connect subsea equipment, spools, structures and rigid or flexible pipelines for various applications. Specific examples of flanged coupling applications are: pipe-to-pipe connections in trenches, normally involving flexible pipelines; connections between flexible pipelines and items of subsea equipment such as pipeline accessories; and connections between items of subsea equipment and spool pipes that carry fluids to or from the subsea equipment.

A pipe flange comprises a radially-extending disc, collar or ring around a central hub that is screwed or welded to a pipe end. A series of parallel holes extends through the flange disc to receive fastenings such as bolts. A sealing gasket may be inserted between mating faces of opposed flanges to provide a seal.

The invention relates particularly to the challenges of centralising, aligning and pulling together two flanges that are initially spaced apart and may be misaligned. To assemble a coupling from such flanges, each hole through one of the flanges has to be aligned with a corresponding hole on the other of the flanges to admit a bolt through the aligned holes. Also, the mating faces of the flanges have to be in substantially parallel planes before a sealing gasket can be inserted between them and the bolts can be tightened.

The challenges of performing these operations are magnified where assembly is performed underwater or by remote control, for example using an unmanned underwater vehicle (UUV) such as an ROV. Remote or robotic assembly may be necessary in deep water below diver depth or in a laying tower of a pipelaying vessel, or may be chosen for safety so that personnel can be kept away from the work site. Thus, the invention is not only concerned with pipe connections made underwater but can instead be employed above the surface, for example on a pipelay support vessel or PLSV, or indeed on land.

The invention is applicable to all flange-to-flange assembly situations but has been developed particularly to solve problems relating to aligning flanges whose mating faces lie in misaligned planes. The invention aims to improve the assembly of flanged couplings in these circumstances and to simplify flange-to-flange mating while applying hydraulic pressure to bring the flanges together.

Aligning and pulling together two flanges for coupling can be a difficult and lengthy operation due to variable 3D geometry and mechanical stresses arising from deformation of the parts, such as pipes, that carry the flanges. Yet, it is desirable to perform such operations as quickly as safety allows. In offshore applications, for example, this minimises the operating cost of a surface support vessel and reduces tie-up of valuable capital equipment. It also shortens the 'weather window' of favourable sea conditions that may be required.

It is known to use ropes or wires to achieve approximate alignment of separated parts before trying to secure the parts to each other through a flanged joint. In these circumstances, personnel working in close proximity may be exposed to components that are under considerable stress. This is risky due to the elastic energy that will be stored in the components when large forces are applied to align the flanges, especially if the flanges have misaligned mating faces. A sudden spring-back release of energy will then arise if any components break or become loose. This presents a serious risk of injury to personnel, in addition to the risk of damage to equipment and assets even if personnel can be kept at a safe distance by the use of automation.

As a specific example, a common flange-alignment technique involves guiding the flanges by pulling wires in a transverse plane using hand-held tag lines or winches while one or both of the flange hubs is driven toward the other flange hub in the axial or longitudinal direction. This has the drawback that connection and disconnection of the wires requires direct intervention on the flanges. Also, the wires are vulnerable to break if they encounter sharp edges.

Figures 3, 4:
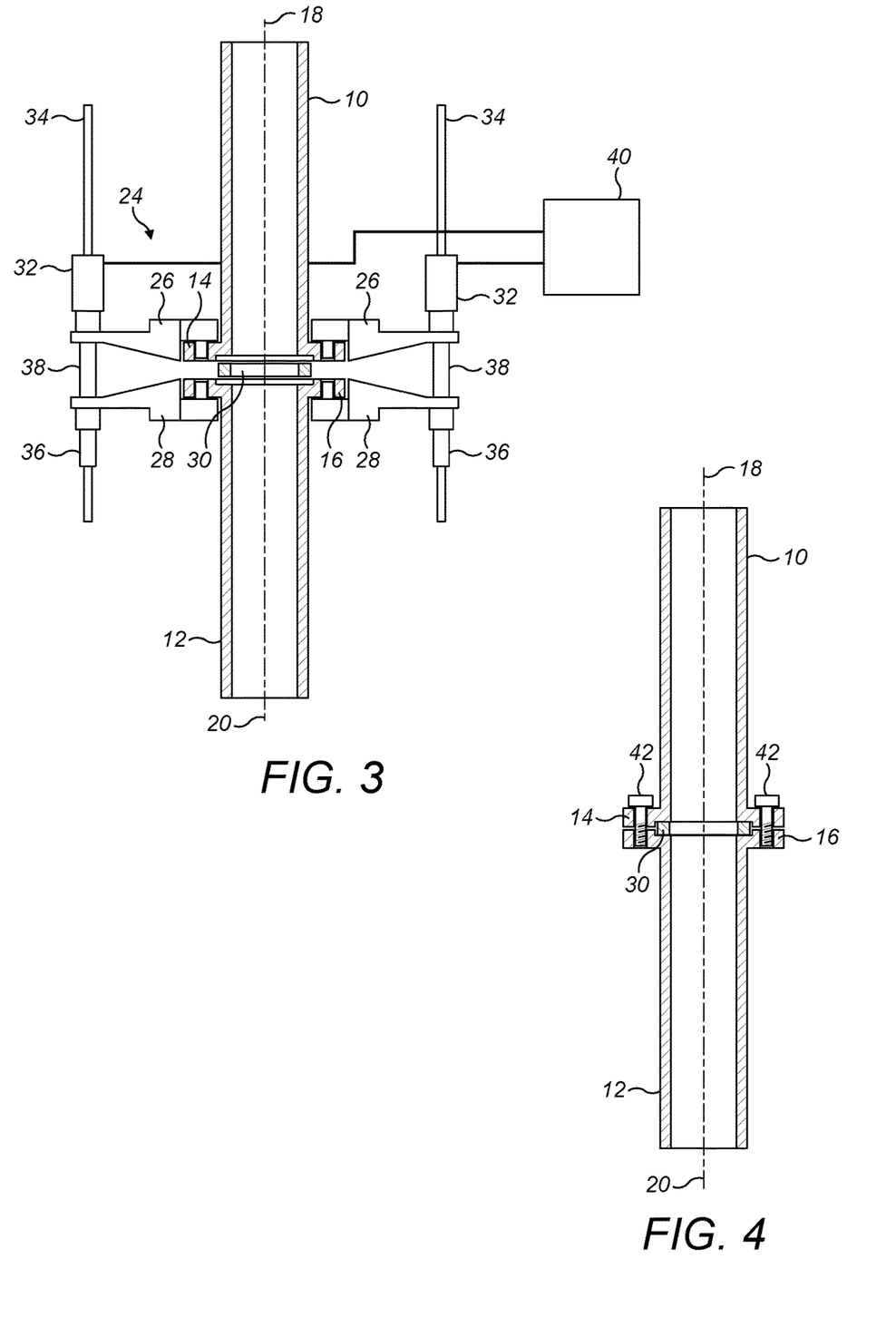
FIG. 3 corresponds to FIG. 2 but now shows the pipes pulled together and aligned by operation of the pulling system of the invention.
FIG. 4 corresponds to FIG. 3 but shows the pulling system now removed from the pipes, leaving the pipes aligned and coupled together by bolts.

A similar known flange-alignment technique uses a jacking system: axially-acting jacks push the flange hubs together while transversely-acting jacks align the mating faces of the flanges by controlling motion around both transverse axes. For example, a subsea alignment jacking system is described in the Applicant's International patent application published as WO 03/040602. FIG. 4 of WO 03/040602 shows that the system is bulky and complex.

A drawback of all jacks is their limited stroke or range of action. This means that an initial phase of axial approach is necessary to reduce the distance between the flanges. That initial phase can be complex to manage, especially when rotation is also needed to bring the flanges into substantially parallel planes.

U.S. Pat. No. 3,658,366 addresses the issue of rotation by using swiveling connector hubs in conjunction with pulling jacks. The hubs are aligned in the same plane by rotating at least one of the hubs. A key drawback of this solution is the need for swiveling connectors, which are expensive and tend to lower the reliability of a pipeline that incorporates them.

U.S. Pat. No. 6,997,645 discloses an alignment system based on one rod cylinder with swivels that maintain rotational degrees of freedom to simplify alignment in the transverse plane, followed by pulling. However, that system is designed for aligning connector hubs and is not capable of aligning flanges; this is because rotation around the axial axis may be needed to align the bores of the flanges for bolting.

Some tool manufacturers offer flange pulling systems, such as are sold under the registered trade mark 'Hydratight'. Flange pulling systems employ a tensile link such as a wire rope, a cable or a straight rigid rod. The link is inserted into opposed holes of the flanges when those holes are aligned or at least approximately aligned with each other. The link is anchored to one flange via a clamp and is gripped by jaws of a hydraulic mechanism acting on the other flange that walks along the link to pull the flanges together. Another option for the link is a threaded draw bar, in which case a hydraulic mechanism acts on a ring nut engaged with the draw bar.

GB 2469933 and GB 2027507 describe similar systems in which rod members are used for flange alignment and hydraulic piston assemblies drive the aligned flanges together.

In CN 101598246, guide chains are extended through opposed flange bolt holes, and lever hoists are used to pull the flanges together.

Known flange pulling systems also have drawbacks. Their pulling force is limited, and the link blocks at least one of the holes and so must be removed before all bolts can be inserted and tightened. The link also hinders insertion of a sealing gasket between the opposed mating faces of the flanges.

If the link is a wire rope or cable, it may be damaged by the edges of the holes if misalignment is excessive; consequently, the system remains sensitive to misalignment of the flanges in transverse planes. Conversely, the alternative of a rigid rod or bar requires accurate pre-alignment of the flanges about the axial axis and in parallel transverse planes. Otherwise, the rod or bar or the flanges may become bent or otherwise damaged.

A further example of an alignment tool for flanged components is disclosed in US 2016/039076, in which alignment pins are used to align bolt holes of the flanges and a slide member brings together the flanges when actuated.

BRIEF SUMMARY OF THE INVENTION

Against this background, the invention provides a pulling and alignment system for flanged components, the system comprising: at least one pair of flange attachments adapted to be fixed to respective flanges of the components that are to be pulled together and aligned for coupling; a puller device supported by at least one of the flange attachments of the pair; and a flexible elongate pulling link extending between the flange attachments of the or each pair, the pulling link being engaged by, and movable relative to, the puller device to act in tension between those flange attachments.

In one aspect of the invention, each flange attachment is a flange extension that comprises: a mounting adapted to fix the flange attachment to a flange; and an arm cantilevered from the mounting to extend beyond the flange and to hold the pulling link outboard of the flange. Correspondingly, the invention provides a method of pulling together and aligning flanged components that comprises: fixing flange attachments to respective flanges of the components as an opposed pair; and tensioning a flexible elongate pulling link between the opposed pair of flange attachments while those flange attachments hold the pulling link outboard of the flange. This enables tension in, and consequent straightening of, the pulling link to apply aligning leverage and torque to the flanges, and maximises access for inserting a sealing gasket between the flanges if needs be.

Preferably, the pulling link extends through an opening in the arm of at least one flange attachment of a pair, the opening being located distally with respect to the mounting.

The mounting conveniently comprises at least one spigot arranged to extend into a bolt hole of a flange. Such a spigot may be radially expandable within the bolt hole for engagement with the flange, and preferably extends transversely with respect to the arm. Where there is an opening in the arm to accommodate the pulling link, that opening suitably extends in a direction substantially parallel to the or each spigot.

In another aspect of the invention, the pulling link is an articulated rod comprising a longitudinal series of rigid elements, each of those elements being pivotably coupled to at least one other of those elements. For example, there may be ball-and-socket couplings between adjacent elements of the series. Limiting formations are preferably provided for limiting relative pivotal movement between adjacent elements of the series. Conveniently, the puller device can engage longitudinally-spaced recesses between adjacent elements of the series.

Correspondingly, therefore, the invention provides a method of pulling together and aligning flanged components, the method comprising: fixing flange attachments to respective flanges of the components as an opposed pair; and tensioning a flexible elongate pulling link between the opposed pair of flange attachments, the pulling link being an articulated rod comprising a longitudinal series of rigid elements, at least one of those elements pivoting with respect to at least one other of those elements as the flanges are pulled together.

Advantageously, therefore, the pulling link is flexible in three dimensions. Thus, the pulling link may be bent along its length, preferably in at least two mutually-transverse directions transverse to its length, to accommodate misalignment between the flanges and then straightened under tension to correct the misalignment.

Convergence between the flanges may be limited to maintain a gap between the flanges. For example, a spacer part may be positioned between, and bear against, the flange attachments to limit convergence between the flange attachments.

The flanges may be coupled with fastenings while the flanges remain apart but aligned and substantially parallel. Thereafter, the flange attachments and the pulling links may be removed and the fastenings may be tightened to bring the flanges together. Where the flange attachments are fixed to fixing holes provided in the respective flanges, the flanges may be coupled with fastenings placed in those fixing holes after removing the flange attachments.

In preferred embodiments, the puller device is supported by a first flange attachment of a pair and the pulling link is fixed relative to a second flange attachment of that pair. For example, a removably-attachable anchor part may act between the pulling link and the second flange attachment. In that case, the anchor part conveniently bears against a side of the second flange attachment that faces away from the first flange attachment.

The puller device preferably comprises a ratchet mechanism movable reciprocally along the pulling link, the ratchet mechanism comprising teeth that are movable radially to engage and pull the pulling link during an advance stroke and to release the pulling link during a return stroke. The puller device may further comprise a unidirectional lock having radially-movable pawls to engage and hold the pulling link during the return stroke of the ratchet mechanism.

Preferred embodiments of the invention have at least two pairs of flange attachments, each with at least one respective puller device and pulling link. More preferably, there are at least three pairs of flange attachments, each with at least one respective puller device and pulling link. For example, if the components are pipes having flanges that extend radially from the pipes, the pairs of flange attachments are preferably distributed angularly around central longitudinal axes of the pipes. In such examples, the system may further comprise a power supply and control system that is capable of actuating the puller devices independently of each other.

Advantageously, the flange attachments may be fixed temporarily to fixing holes provided in the respective flanges, such fixing holes being usable subsequently to receive fastenings that couple the flanges together. In that case, the flange attachments preferably occupy fewer fixing holes than are provided in the respective flanges, others of those fixing holes remaining unoccupied to receive fastenings that initially couple the flanges together. For example, where there are at least two flange attachments on each flange, the unoccupied fixing holes may lie between those flange attachments.

The present invention provides a safe alignment system that aims to achieve approximate flange alignment and to realise complete flange-to-flange assembly when actuated, preferably by hydraulic pressure. The system of the invention enables the steps of bolting make-up and subsequent seal testing to be performed more quickly and more safely than can be achieved with existing alignment systems. The system can be used with all flange sizes on the market, for example with internal bores ranging from 7¹⁄₁₆" to 11" (179 mm to 279 mm) for handling between 5000 psi and 10000 psi (34.5 MPa and 69 MPa), in accordance with API Specification 6A of the American Petroleum Institute.

In preferred aspects, the invention provides a remotely-operable hydraulic alignment and pulling system and method that is compliant with any standard flange. The invention can align the opposed mating faces rotationally around the three rotation axes and subsequently or simultaneously displace the flanges relative to each other in translation in the axial direction.

Flange attachments such as flange pads are coupled to the flanges, preferably by bolting. The pads provide an easily-removable interface and an extended lever arm to decrease the power required. An alignment and pulling unit is coupled to one pad. An articulated rod goes through the unit and is connected to a reaction item on the second pad: The rod has small segments that can pivot to provide required degrees of freedom around the three axes. The rod is therefore flexible and can deform in all three dimensions. A segment is shorter than the stroke of the piston-like mechanism of the pulling unit.

Flange pads provide a simple interface so that the bores through the flanges are not damaged and the lever arm is increased, which allows a compact system requiring lower actuation forces. During an alignment and pulling process, pulling in the axial direction automatically rotates one flange until it is aligned. At least three puller units are preferred to perform correct alignment.

In a final state, the faces of the flanges are parallel and their bores are aligned, at a short distance that allows a sealing gasket to be inserted between the flanges and for bolts to be inserted through the bores before tensioning.

An embodiment of the invention provides a tool for aligning and pulling together two flanges. The tool comprises at least one alignment system that comprises a first extension pad coupled to the first flange and a second extension pad coupled to the second flange. The extension pads may, for example, be bolted to the flanges. The first extension pad carries at least one aligning and pulling unit comprising a pulling link that can be coupled to the second extension pad. The aligning and pulling unit can ensure at least three rotational degrees of freedom relative to at least one extension pad.

The aligning and pulling unit may displace the pulling link in translation. The pulling link may be an articulated rod which comprises a plurality of segments connected two by two by swivels. There may be at least three alignment systems.

The invention may also be embodied in a method to align two flanges remotely, the method comprising: mounting at least one extension pad on each flange; mounting at least one aligning and pulling unit on the or each extension pad of one flange, the aligning and pulling unit comprising an articulated rod; connecting the rod to an opposite extension pad of the other flange; and applying a pulling force to the articulated rod until the faces of the flanges are parallel and their bores are aligned.

The invention solves problems encountered when aligning flanges during connection, overcoming misalignment of termination face planes of the flanges. The invention facilitates remote intervention, combining safety of operation with easier handling and faster intervention than was previously possible. Thus, the invention provides a safer, simpler and quicker way of aligning flanges than current, largely manual techniques.

With just one type of tool, the invention can solve problems of flange approximation and assembly for all flanges used commercially in the oil and gas industry. The tool is ideally adapted for offshore use. The invention enables hydraulic intervention to be applied simply from a single source through a valve manifold that controls a sequence of pressure application. The necessary intervention may be applied largely outside the line-of-fire of stress loading in the flanged parts, allowing safer operation with less risk to personnel and equipment in the event of mechanical failure.

BRIEF DESCRIPTION OF THE SEVERAL VIEWS OF THE DRAWINGS

In order that the invention may be more readily understood, reference will now be made, by way of example, to the accompanying drawings in which.

DETAILED DESCRIPTION OF THE INVENTION

FIGS. 1 to 4 are simplified schematic drawings that show the principle of the invention. Conversely, FIGS. 5 to 13, which will be described later, are detailed drawings of a preferred embodiment of the invention that embodies the principle shown in FIGS. 1 to 4.

Figure 1:
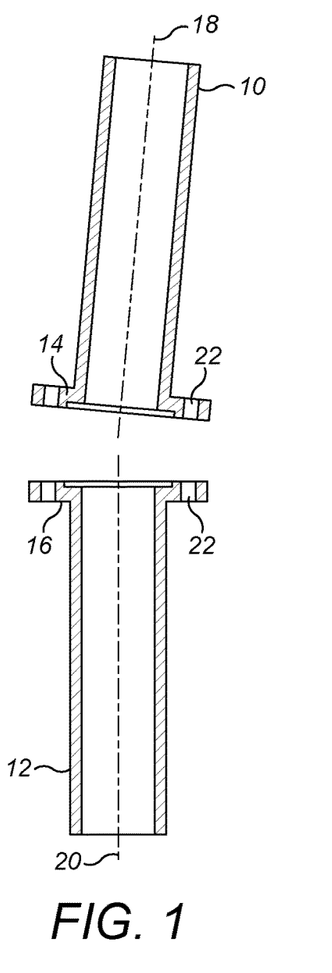
FIG. 1 is a schematic side view showing two flanged pipes, spaced apart and mutually misaligned.

FIG. 1 shows upper and lower pipes 10, 12, spaced apart and mutually misaligned but facing each other end-to-end.

In this example, the pipes 10, 12 are subsea pipes located underwater although they could instead be above the surface, for example on an installation vessel, or on land.

It will be appreciated that references to 'upper' and 'lower' in this description are merely for convenience of illustration and explanation. In reality, pipes that require end-to-end coupling may be in a variety of orientations other than approximately vertical, upright orientation shown in the example here.

Each pipe 10, 12 terminates in a respective flange 14, 16 whereby the pipes 10, 12 can be coupled together for fluid communication between them. As is conventional, the flange 14, 16 of each pipe 10, 12 extends radially in a plane that is orthogonal to the central longitudinal axis 18, 20 of that pipe 10, 12. As is also conventional, the flanges 14, 16 are penetrated by matching circumferential arrays of bolt holes 22 whose longitudinal axes lie parallel to the central longitudinal axis 18, 20 of the associated pipe 10, 12.

The pipes 10, 12 are shown in FIG. 1 separated longitudinally and misaligned. There is lateral misalignment or offset of each pipe 10, 12 with respect to a central longitudinal axis of the other pipe 10, 12. Specifically, the central longitudinal axes 18, 20 of the pipes 10, 12 are non-parallel in this example although, in other examples, they could be parallel but still also laterally misaligned. There may also be angular misalignment of each pipe 10, 12 in a circumferential direction about the central longitudinal axis 18, 20 of the other pipe 10, 12.

Thus, the flanges 14, 16 shown in FIG. 1 lie in respective planes that are widely spaced longitudinally and are not mutually parallel. For example, the flanges 14, 16 may start with a nominal distance between them of up to approximately 50 cm or more. Also, the necessary circumferential alignment between opposed bolt holes 22 of the flanges 14, 16 may be lacking. Consequently, the pipes 10, 12 have to be drawn closer together and brought into lateral and angular alignment before their flanges 14, 16 can be bolted together.

Figure 2:
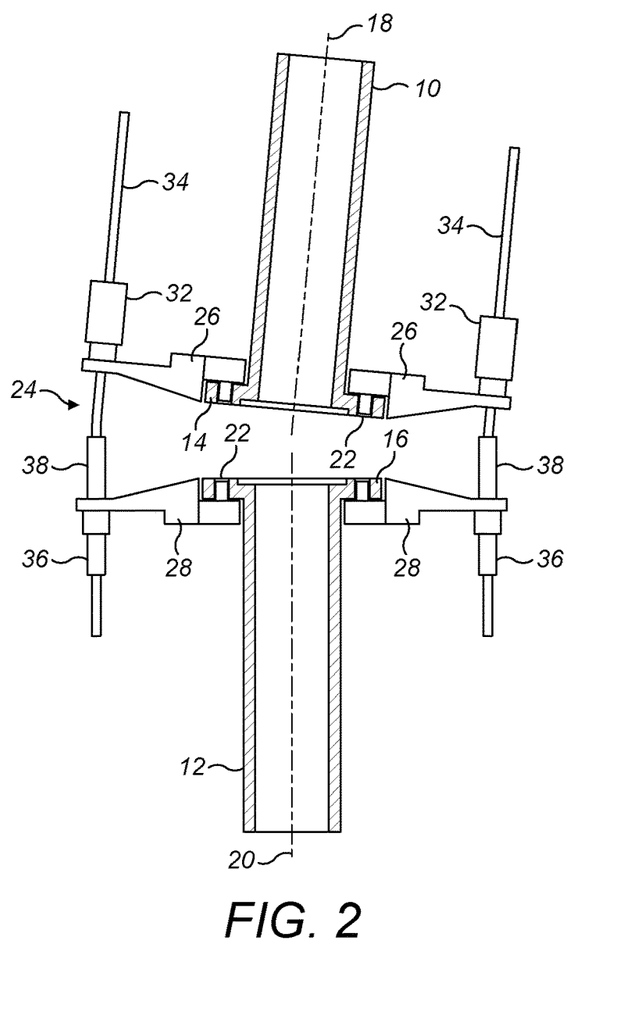
FIG. 2 corresponds to FIG. 1 but shows the pipes of FIG. 1, now fitted with components of a pulling system in accordance with the invention.

For this purpose, the flanges 14, 16 of the pipes 10, 12 are shown in FIG. 2 supporting components of a pulling system 24 in accordance with the invention. Practical embodiments of those components will be described in detail later with reference to FIGS. 5 to 13. The components may, for example, be installed onto the flanges 14, 16 by diver intervention or by using a UUV such as an ROV in water that is too deep for divers to operate safely.

Specifically, the pulling system 24 comprises sets of upper and lower flange attachments 26, 28 that are cantilevered in a radially outward direction from the respective flanges 14, 16 with angular, preferably equiangular, spacing around the central longitudinal axis 18, 20 of the associated pipe. Each flange attachment 26, 28 of one set has a counterpart in the other set to form an opposed pair.

The respective sets of flange attachments 26, 28 are fixed temporarily onto each of the flanges 14, 16, suitably using some of the bolt holes 22 on the flanges 14, 16 for fixing purposes while leaving other bolt holes 22 between the flange attachments 26, 28 unused.

Figure 5:
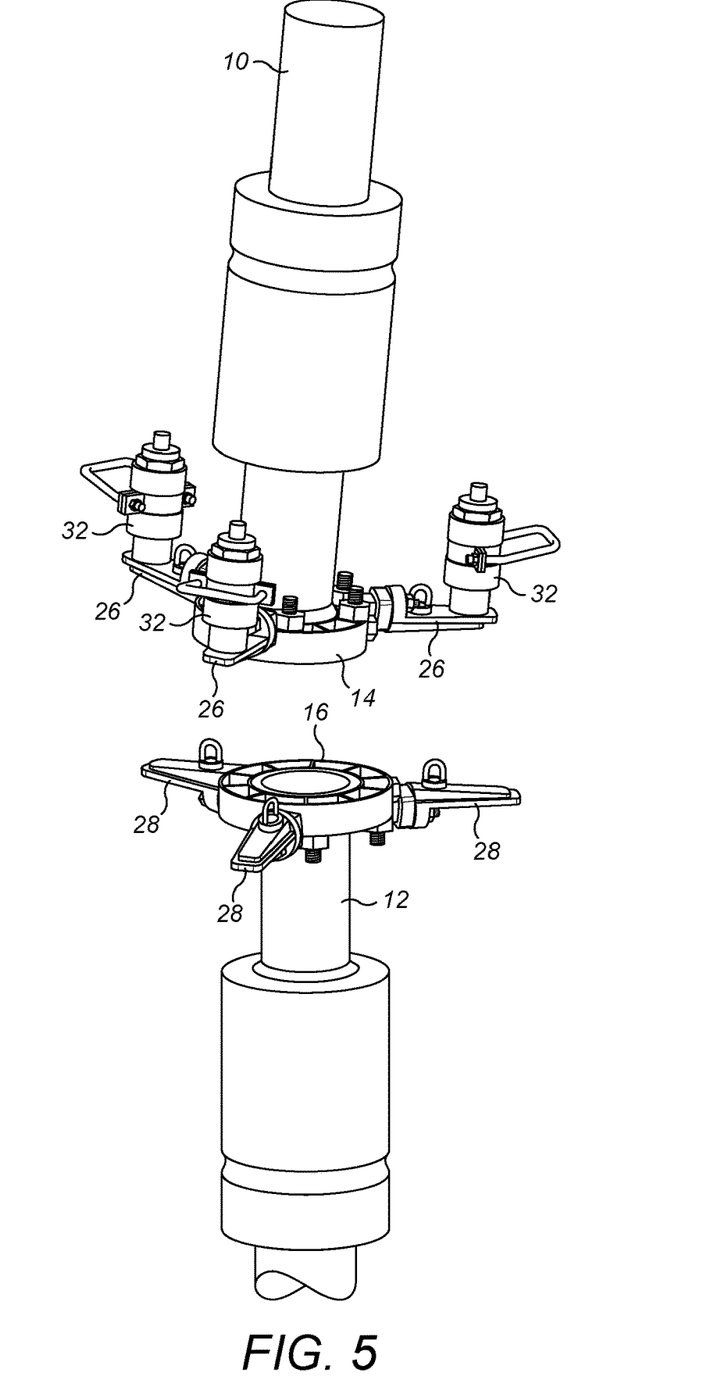
FIG. 5 is a perspective view of two flanged pipes, spaced apart and mutually misaligned, fitted with some components of a pulling system in a practical embodiment of the invention.
Figure 6:
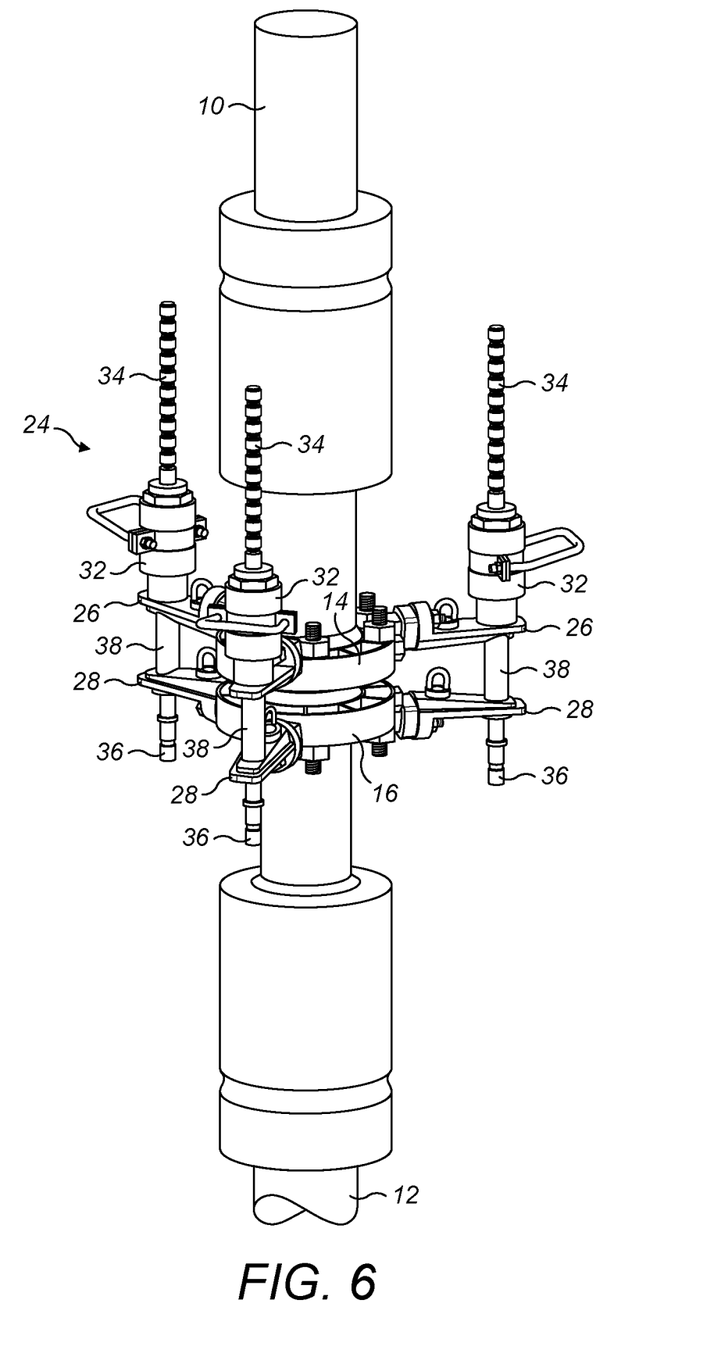
FIG. 6 corresponds to FIG. 5 but shows the pipes now fitted additionally with other components of the pulling system and pulled together and aligned by operation of that system.

To simplify presentation, FIGS. 2 and 3 show just two flange attachments 26, 28 in each set, diametrically opposed with 180-degree spacing around the central longitudinal axis 18, 20 of the associated pipe 10, 12. In practical solutions, however, each set comprises more than two such flange attachments 26, 28, most preferably at least the three flange attachments 26, 28 per set that are shown in FIGS. 5 and 6. That latter arrangement enables alignment of the flanges 14, 16 about x-, y- and z-axes and optimises the distribution of pulling forces around the central longitudinal axes 18, 20 of the pipes 10, 12 that draw the flanges 14, 16 together. That latter arrangement also maintains circumferential space between the flange attachments 26, 28 to access the unused bolt holes 22 and, if required, to place a sealing gasket 30 between the flanges 14, 16 as shown in FIG. 3.

The upper flange attachments 26 support respective generally tubular puller devices 32. A tensile member in the form of a pulling stem or rod 34 extends through each puller device 32 and between, and through, opposed pairs of flange attachments 26, 28. Each pulling rod 34 has flexibility to be bent along its length in two axes to adopt curvature in three dimensions. The ability to adopt such curvature accommodates lateral or angular misalignment of the flanges 14, 16 as shown in FIG. 2.

The flexibility of the pulling rods 34 is akin to that of a wire or chain and so is to be distinguished from mere elastic deflection of a fundamentally rigid rod. Thus, the pulling rods 34 can be bent along their length without being strained or deformed permanently and will straighten readily under longitudinal tension without relying on elastic recovery or requiring further permanent deformation. Preferably, however, the pulling rods 34 only have flexibility within a limited range of deflection as will be described later.

Quick-reaction anchor collets 36 surround and anchor the pulling rods 34 against tensile forces exerted by the puller devices in use. Each anchor collet 36 bears against a longitudinally outer side of a respective lower flange attachment 28. A spacer sleeve 38 surrounding each pulling rod 34 is disposed between each opposed pair of flange attachments 26, 28.

FIG. 3 shows the puller devices 32 connected to a hydraulic supply and control system 40 that drives the puller devices 32 individually and/or collectively in multiple reciprocal strokes. With each stroke, the puller devices 32 pull on the respective pulling rods 34, which are held by the anchor collets 36, and hence draw the upper and lower flanges 14, 16 toward each other. During this process, tension in the pulling rods 34 straightens the pulling rods 34 and hence deflects, and if necessary also turns, the pipes 10, 12 against elastic recovery forces to adopt the required mutual alignment.

The flexibility of the pulling rods 34 is advantageously limited to a particular range of deflection so as to apply lateral aligning forces to the flange attachments 26, 28 as the pulling rods 34 are placed under tension and as the longitudinal gap between the flange attachments 26, 28 narrows in use. Thus, the pulling rods 34 become effectively rigid when bent to a limiting degree, hence resisting being bent further in that direction.

The radial length of the flange attachments 26, 28 offsets the pulling rods 34 radially to a substantial distance outboard of the flanges 14, 16. This advantageously maximises leverage applied by the pulling rods 34 to the flanges 14, 16 via the flange attachments 26, 28. Leverage is increased in yaw about the central longitudinal axes 18, 20 of the pipes 10, 12 and also about pitch and roll axes orthogonal to those central longitudinal axes 18, 20. The radial offset of the pulling rods 34 also advantageously increases the space available to place a sealing gasket 30 between the flanges 14, 16 as shown in FIG. 3.

It will be apparent that one of the puller devices 32 may need to be actuated through more or fewer pulling strokes than the other puller device 32 to draw the flanges 14, 16 into parallel alignment. This depends upon the gap between the flanges 14, 16 at the respective angular positions of the puller devices 32 with respect to the circumference of the upper flange 14.

FIG. 3 shows the result of the pulling operation, with the pulling rods 34 now substantially straight and the pipes 10, 12 now brought into lateral and angular alignment so that their flanges 14, 16 can be bolted together. Thus, the flanges 14, 16 now lie in mutually parallel planes and there is now circumferential alignment between opposed bolt holes 22 of the flanges 14, 16. The flanges 14, 16 are also now close enough to each other longitudinally that bolts 42 can be inserted into the opposed bolt holes 22, ready for tightening to complete the coupling.

The spacer sleeves 38 limit convergence between the flanges 14, 16 by bearing against longitudinally inner sides of the flange attachments 26, 28. This ensures that a small longitudinal gap remains to leave space for an annular sealing gasket 30 to be inserted between the flanges 14, 16 as shown in FIG. 3. Once the gasket 30 has been installed and the components of the pulling system 24 have been removed, bolts 42 can be installed and tightened to draw the flanges 14, 16 tightly together. This sandwiches the gasket 30 in face-to-face sealing relation as shown in FIG. 4.

The first such bolts 42 can occupy the spare bolt holes 22 in the flanges 14, 16 that were left unused between the angularly-spaced flange attachments 26, 28. Once those first bolts 42 have been installed to hold the flanges 14, 16 together with the correct alignment, the components of the pulling system 24 can be dismantled and removed from the flanges 14, 16 to make space for the final bolts 42 to be installed through the remaining bolt holes 22 thus made available. All of the bolts 42 can then be tightened to complete the coupling as shown in FIG. 4.

A practical embodiment of the invention will now be described with reference to FIGS. 5 to 13. Like numerals designate like parts.

FIGS. 5 and 6 show that there are three flange attachments 26, 28 on each flange 14, 16 in this example, spaced at 120-degree intervals around the central longitudinal axes of the associated pipes 10, 12. The flange attachments 26 on one flange 14 are positioned so that when the pipes 10, 12 are brought into correct alignment as shown in FIG. 6, they will align angularly with, and hence longitudinally oppose, the corresponding flange attachments 28 on the other flange 16. Initially, however, there may be only approximate angular alignment between opposed pairs of flange attachments 26, 28. The limited flexibility of the pulling rods 34 is sufficient to accommodate such misalignment.

FIG. 5 shows the set of upper flange attachments 26 supporting respective puller devices 32. Other components of the pulling system 24 have been added in FIG. 6, which shows the pulling rods 34 now extending through the respective puller devices 32. The hydraulic supply and control system 40 of FIG. 3 has been omitted from FIG. 6 for clarity but can control the puller devices 32 collectively and/or individually to bring the flanges 14, 16 into parallel relation.

Figure 7:
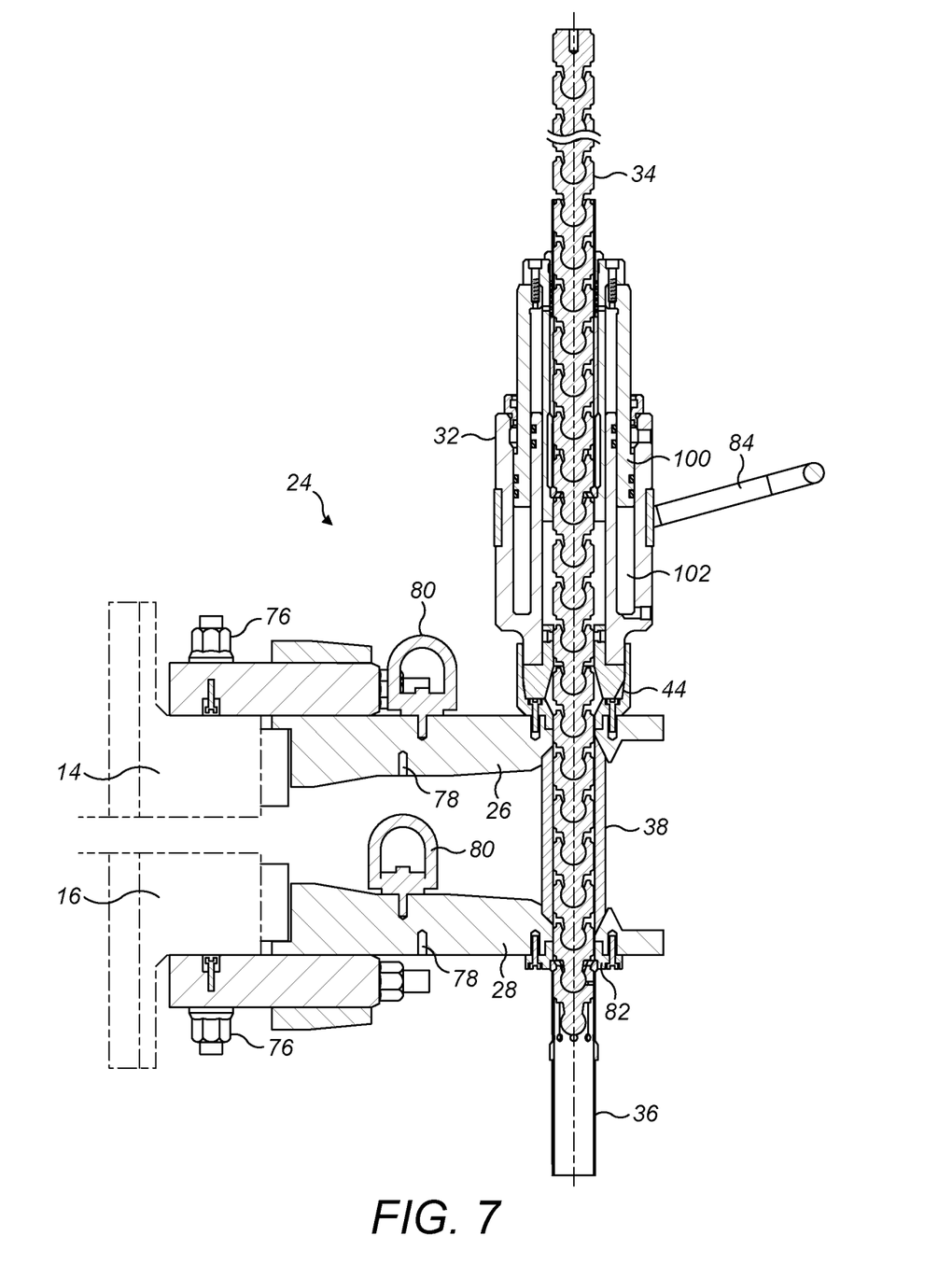
FIG. 7 is an enlarged partial longitudinal sectional side view of the flanged pipes and attached components of the pulling system.

The pulling rods 34 extend from the puller devices 32 though the upper flange attachments 26, through respective spacer sleeves 38 and through the opposed lower flange attachments 28 to be held by the anchor collets 36. This arrangement may best be appreciated with reference to the longitudinal sectional view of FIG. 7. FIG. 7 also shows that the puller devices 32 seat into respective upwardly-opening cups 44 on the upper flange attachments 26.

The main components of the pulling system 24 will now be described individually with reference to the remaining drawings.

Figure 8:
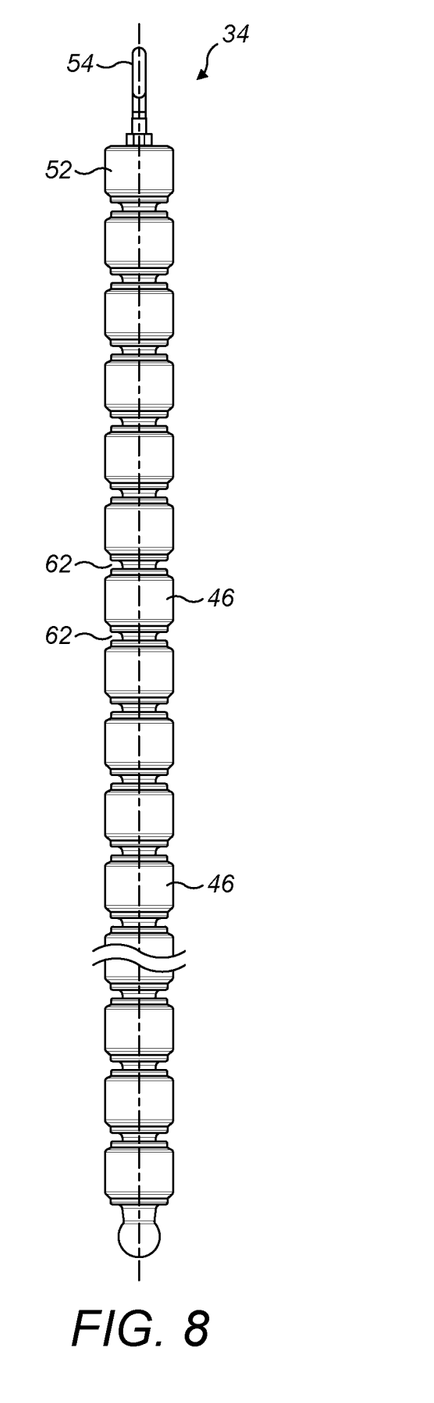
FIG. 8 is a side view of a pulling rod 34 of the pulling system shown in FIGS. 6 and 7.
Figure 9:
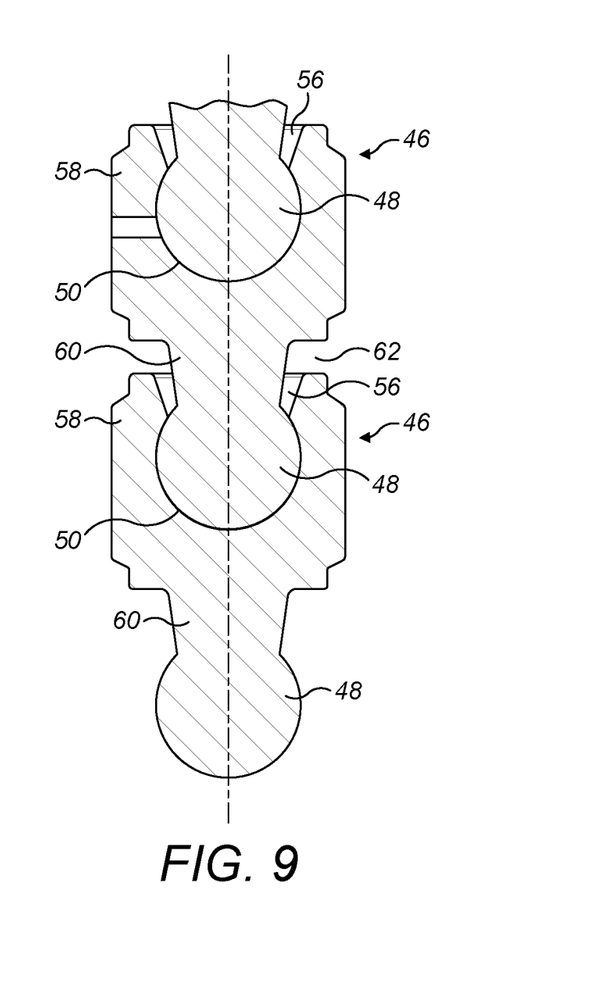
FIG. 9 is an enlarged longitudinal sectional view of successive links of the pulling rod shown in FIG. 8.

FIGS. 8 and 9 show one of the pulling rods 34 individually and in detail. It can be seen that the pulling rod 34 is made up of a longitudinal series of elements or links 46 that are each pivotably coupled to their immediate neighbours in the series. Thus, in this example, the pulling rod 34 has flexibility along its length by virtue of articulation. Moreover, the articulation is such as to confer flexibility on the pulling rod 34 in three dimensions.

The three-dimensional flexibility of the pulling rod 34 is effected by ball-and-socket coupling between adjoining links 46 of the series. In this respect, FIG. 9 shows that each link 46 of the pulling rod 34 comprises a part-spherical head 48 at one end and a correspondingly-shaped oppositely-facing socket 50 that receives and pivotably engages with the head 48 of a neighbouring link 46. If needs be, the head 48 can move within the socket 50 not just pivotably about axes orthogonal to the longitudinal axis of the pulling rod 34 but also angularly around that longitudinal axis. Consequently the pulling rod 34 can also partially rotate around the longitudinal axis.

A terminal link 52 at the upper end of the pulling rod 34, as shown, need not have a socket 50 but instead, in this example, has a lifting eye 54 whereby the pulling rod 34 may be lowered and manipulated.

The socket 50 of each link 46 lies at an inward end of a short conically-tapering passage 56 that opens to one end of a surrounding, generally cylindrical body 58. The body 58 is joined to the head 48 by a relatively narrow, distally-tapering neck 60 at the other end of the body 58. When the links 46 are assembled to form the pulling rod 34, circumferential recesses defining longitudinally-spaced gaps 62 between their successive bodies 58 allow clearance for the links 46 to pivot relative to each other about their ball-and-socket couplings. Another advantage of the gaps 62 between the bodies 58 of adjoining links 46 is to provide convenient longitudinally-distributed locations for mechanical engagement with inwardly-facing teeth or pawls of the surrounding puller devices 32, as will be explained.

The taper of the passage 56 defines a limited clearance around the narrower neck 60 to afford the head 48 of each link 46 a limited degree of pivotal movement in any direction with respect to the socket 50 in which the head 48 is engaged. However when the neck 60 encounters a wall of the passage 56, no greater pivotal deflection is possible. Thus, the pulling rod 34 is flexible to allow free bending in three dimensions up to a limit but no bending is possible beyond that limit. In this way, the pulling rod 34 has the flexibility that is necessary to accommodate misalignment of the pipes 10, 12 but when placed under tension, the pulling rod 34 can effectively exert the torque or lateral forces that are necessary to correct misalignment of the pipes 10, 12.

It will also be apparent that the fewer the links 46 of the pulling rod 34 that lie between the flange attachments 26, 28 as the flange attachments 26, 28 are drawn longitudinally together, the less lateral or angular misalignment the pulling rods 34 will tolerate. Thus, as oppositely-paired flange attachments 26, 28 approach each other, they are forced more fully into mutual lateral and angular alignment.

Figure 10:
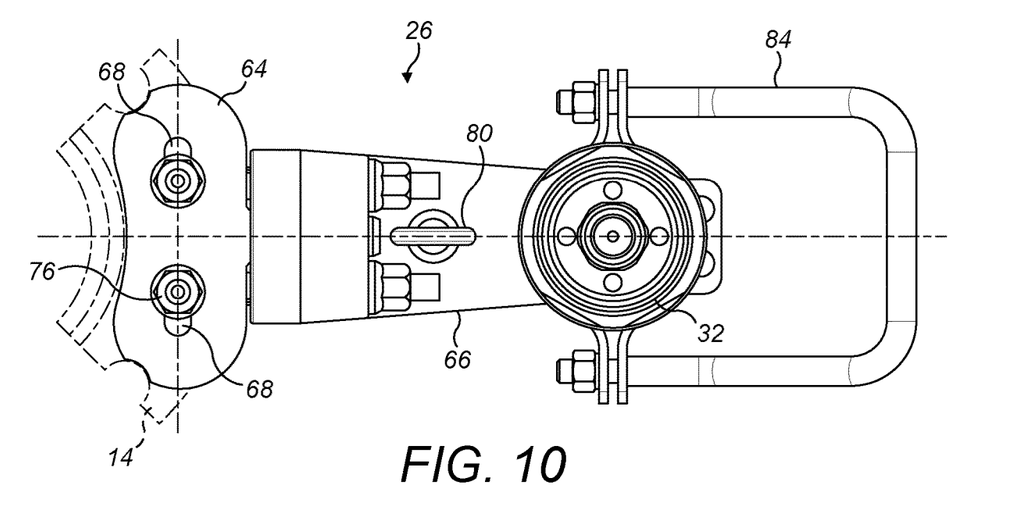
FIG. 10 is a plan view of an upper flange attachment and puller device of the pulling system shown in FIGS. 5 to 7.
Figure 11:
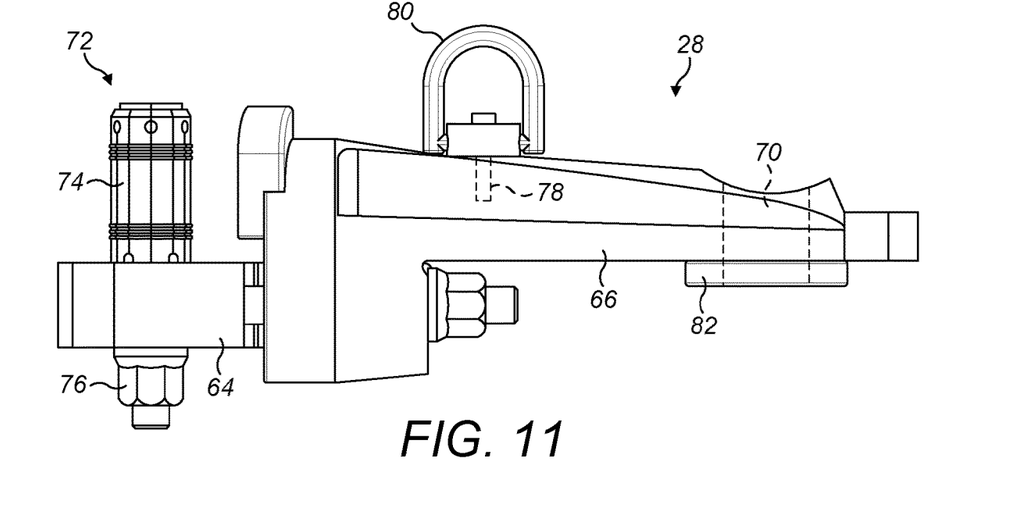
FIG. 11 is a plan view of a lower flange attachment of the pulling system shown in FIGS. 5 to 7.

FIGS. 10 and 11 show upper and lower flange attachments 26, 28 arranged to be fixed, respectively, to the upper and lower flanges 14, 16 of the pipes 10, 12 shown in FIGS. 5 and 6.

Each flange attachment 26, 28 comprises a radially inner root portion 64 and an arm portion 66 that extends radially outwardly beyond the outward edge of the flange 14, 16. The root portion 64 is penetrated by a pair of fixing holes 68 spaced such that the flange attachment 26, 28 can be fixed temporarily to the flange 14, 16 using adjacent bolt holes 22 of the flange 14, 16. The arm portion 66 is penetrated, in turn, by a through-hole 70 that lies radially outboard of the outward edge of the flange 14, 16.

Each fixing hole 68 of the root portion 64 holds a radially-expandable fixing 72 that protrudes from the root portion 64 in alignment with the longitudinal axis of the fixing hole 68. A protruding spigot 74 of each fixing 72 may be inserted into a respective bolt hole 22 of a flange 14, 16 and may then be secured in the bolt hole 22 by turning a nut 76 at a head end of the fixing 72 opposed to the spigot 74. This expands the spigot 74 radially against the inside of the bolt hole 22.

The fixing holes 68 may be extended circumferentially into curved slots to allow the flange attachments 26, 28 to be used with various spacings between bolt holes 22 of the flanges 14, 16.

The longitudinal axis of the through-hole 70 is parallel to the longitudinal axes of the fixing holes 68. It follows that when a flange attachment 26, 28 has been fixed to the flange 14, 16 by the radially-expandable fixings 72, the longitudinal axis of the through-hole 70 is substantially parallel to the central longitudinal axis 18, 20 of the associated pipe 10, 12.

Each flange attachment 26, 28 has the fixing holes 68 and the through-holes 70 in identical positions. Thus, when the pipes 10, 12 are in correct alignment, the through-holes 70 of opposed flange attachments 26, 28 fixed to the respective flanges 14, 16 are substantially aligned on a common longitudinal axis.

Advantageously, the upper and lower flange attachments 26, 28 are identical and can be adapted to suit their respective roles by attaching components such as the aforementioned cups 44 into which the puller devices 32 seat. Thus, each flange attachment 26, 28 has threaded holes 78 to position a lifting shackle 80 on an upper side of the arm portion 66 for supporting the flange attachment 26, 28 before it is bolted to the appropriate flange 14, 16. Also, the cups 44 on the upper side of the upper flange attachments 26 that receive puller devices 32 can be replaced by seat formations 82 on the lower side of the lower flange attachments 28 for engagement with the anchor collet 36.

The upper flange attachment 26 shown in FIG. 10 is shown fitted with a puller device 32, which will now be described in detail with reference to FIG. 12. Reference will also be made to the aforementioned FIG. 7, which similarly shows the puller device 32 in longitudinal sectional view. However, FIGS. 7 and 12 differ in that the puller device 32 is shown, respectively, in different reciprocal states. Specifically, FIG. 7 shows the puller device 32 in an extended state and FIG. 12 shows the puller device in a retracted state.

Figure 12:
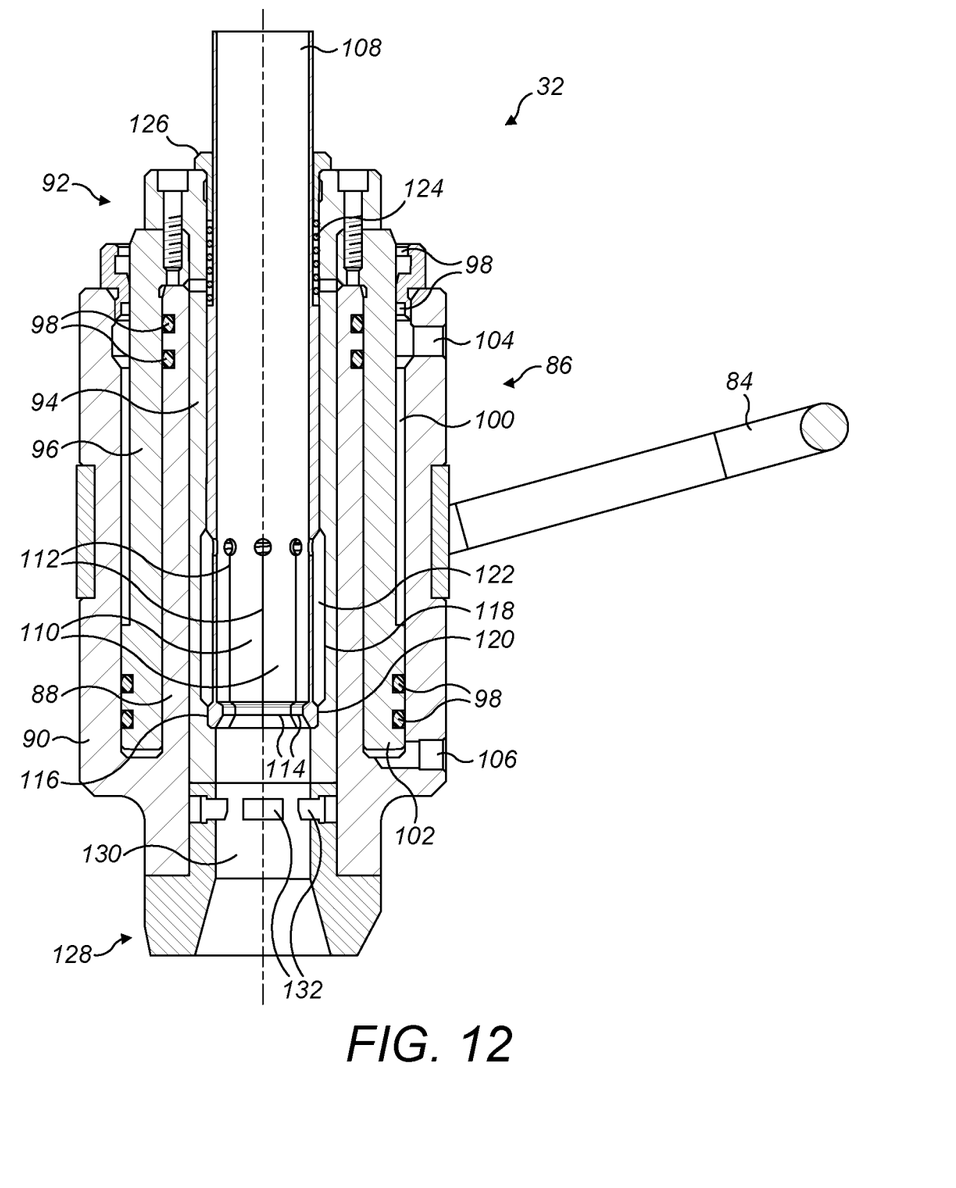
FIG. 12 is an enlarged longitudinal sectional side view of a puller device of the pulling system shown in FIGS. 5 to 7.

FIGS. 7, 10 and 12 show a loop handle 84 extending from a tubular body 86 of the puller device 32, whereby an offshore worker, a diver or a UUV, such as an ROV, can grasp and manipulate the puller device 32.

The body 86 of the puller device 32 comprises tubular inner and outer body walls 88, 90. The inner and outer body walls 88, 90 are in mutually-spaced concentric relation to define an annular gap between them.

The puller device 32 further comprises a tubular piston 92 that is mounted telescopically to the body 86 for longitudinal sliding reciprocal motion relative to the body 86. The stroke of the piston 92 is the longitudinal distance between its positions in the extended state shown in FIG. 7 and the retracted state shown in FIG. 12. The stroke exceeds the longitudinal distance between successive gaps 62 between the links 46 of a pulling rod 34. A nominal example of a stroke length is 115 mm.

Like the body 86, the piston 92 comprises inner and outer tubular piston walls 94, 96 in mutually-spaced concentric relation to define an annular gap between them. The inner piston wall 94 slides within the inner body wall 88 in concentric relation. The outer piston wall 96 is received in the annular gap between the inner and outer body walls 88, 90. Conversely, therefore, the inner body wall 88 is received in the annular gap between the inner and outer piston walls 94, 96.

Sliding circumferential seals 98 act between the outer piston wall 96 and the inner and outer body walls 88, 90 to define variable-volume actuator chambers 100, 102. The volumes of the actuator chambers 100, 102 are determined by the longitudinal position of the outer piston wall 96 with respect to the inner and outer body walls 88, 90 that sandwich the outer piston wall 96 between them.

Reciprocation of the piston 92 is driven by alternating flows of hydraulic fluid into and out of the actuator chambers 100, 102 through respective ports 104, 106, under the control of an external hydraulic supply and control system 40 as shown schematically in FIG. 3. By way of example, hydraulic fluid pressure of between 1500 psi and 2000 psi (approximately 100 to 140 bars) may be expected to produce an axial tension in each pulling rod 34 that is sufficient to apply 7000 kg of force to the flanges 14, 16.

The inner piston wall 94 surrounds and supports a tubular locking collet 108 that in turn surrounds the pulling rod 34. The inner piston wall 94, the locking collet 108 and the pulling rod 34 are all in concentric relation. The locking collet 108 is slidable axially over a limited range relative to the inner piston wall 94.

The locking collet 108 can engage and disengage the pulling rod 34 by virtue of radially-movable, longitudinally-extending fingers 110 at one end of the locking collet 108. That end of the locking collet 108 is divided by longitudinally-extending, circumferentially-spaced slits 112 to form the fingers 110.

Each finger 110 has, at its distal end, a radially-inwardly-facing tooth 114 and a radially-outwardly-projecting cam follower 116. The teeth 114 move radially by virtue of resilient radial deflection of the fingers 110. The radial deflection of the fingers 110 is driven or enabled, in turn, by the cam followers 116 bearing against and following an internal cam surface 118 of the inner piston wall 94.

Thus, the internal cam surface 118 of the inner piston wall 94 is shaped to interact with the cam followers 116 of the locking collet 108 by virtue of relative axial movement between the locking collet 108 and the inner piston wall 94. By virtue of that interaction, the teeth 114 of the locking collet 108 move radially to engage and disengage the pulling rod 34 disposed within.

More specifically, the locking collet 108 can move relative to the inner piston wall 94 between a locked position and an unlocked position. In the locked position, the teeth 114 are held closed together to engage in gaps 62 between links 46 of the pulling rod 34 as the associated cam followers 116 bear against a radially-narrowed throat 120 of the internal cam surface 118. Conversely, in the unlocked position, the cam followers 116 of the teeth 114 align instead with a radially-enlarged annular recess 122 in the internal cam surface 118, spaced longitudinally from the throat 120.

As a result of the cam followers 116 aligning with the annular recess 122 in the internal cam surface 118, the teeth 114 are freed to open apart and hence to disengage the gaps 62 between links 46 of the pulling rod 34 as the associated cam followers 116 can move radially outwardly into the recess 122. The pulling rod 34 is now disengaged to move relative to the locking collet 108. Hence, the piston 92 that contains the locking collet 108 can move relative to the pulling rod 34 and the body 86, downwardly as illustrated, during a retraction stroke.

The locking collet 108 is biased into the locked position, also downwardly in this example, by a spring 124 that acts axially between the locking collet 108 and a locking ring 126 fixed to the piston 92. The spring 124 forces the cam followers 116 into the throat 120 of the internal cam surface 118 to hold the teeth 114 closed together around the pulling rod 34. The pulling rod 34 cannot move downwardly relative to the piston 92, as illustrated, without the bias of the spring 124 closing the teeth 114 to prevent further movement of the pulling rod 34 in that direction.

The bias of the spring 124 can, however, be overcome by movement of the pulling rod 34 against the direction of bias, in an upward direction as illustrated. This dislodges the cam followers 116 from the throat 120 to align instead with the radially-enlarged annular recess 122 of the internal cam surface 118. Upon reaching the recess 122, the cam followers 116 are freed to move radially outwardly so that the teeth 114 can open apart to disengage the pulling rod 34. This allows the piston 92 to move downwardly relative to the pulling rod 34, as illustrated, during each retraction stroke.

Thus, by virtue of its interaction with the longitudinally-reciprocating piston 92, the locking collet 108 interacts with the pulling rod 34 with a ratchet action to drive the pulling rod 34 through the puller device 32 unidirectionally, namely upwardly as illustrated. To ensure that the pulling rod 34 can only travel in that one direction relative to the puller device 32, the puller device 32 further comprises a unidirectional locking device 128 at its lower end.

The locking device 128 is generally tubular and has a central channel 130 spaced longitudinally from, and aligned coaxially with, the locking collet 108 of the piston 92. Inwardly-projecting radially-movable pawls 132 are spaced angularly around the channel 130 and are biased radially inwardly to engage a gap 62 between the links 46 of a pulling rod 34.

The pawls 132 are shaped with inclined ramp surfaces on their inner sides to retract radially outwardly against their bias and hence to disengage from a gap 62 between links 46 of the pulling rod 34 when the pulling rod 34 moves upwardly through the locking device 128. On encountering the next gap 62 between links 46 of the pulling rod 34, the bias of the pawls 132 snaps them into that gap 62 and hence back into engagement with the pulling rod 34.

Unlike the inclined ramp surfaces on their inner sides, upper sides of the pawls 132 extend orthogonally with respect to the longitudinal axis of the channel 130. Consequently once the pawls 132 are engaged in a gap 62, the pulling rod 34 cannot travel in the opposite direction to that intended, i.e. downwardly through the locking device 128 in the illustrated example. Thus, the pulling rod 34 is tensioned between the anchor collet 36 and the pawls 132 while the piston 92 of the puller device 32 is moved longitudinally to grip and pull another section of the pulling rod 34.

Externally, the locking device 128 shaped with a downward taper to fit closely into the aforementioned cup 44 of an upper flange attachment 26.

Figure 13:
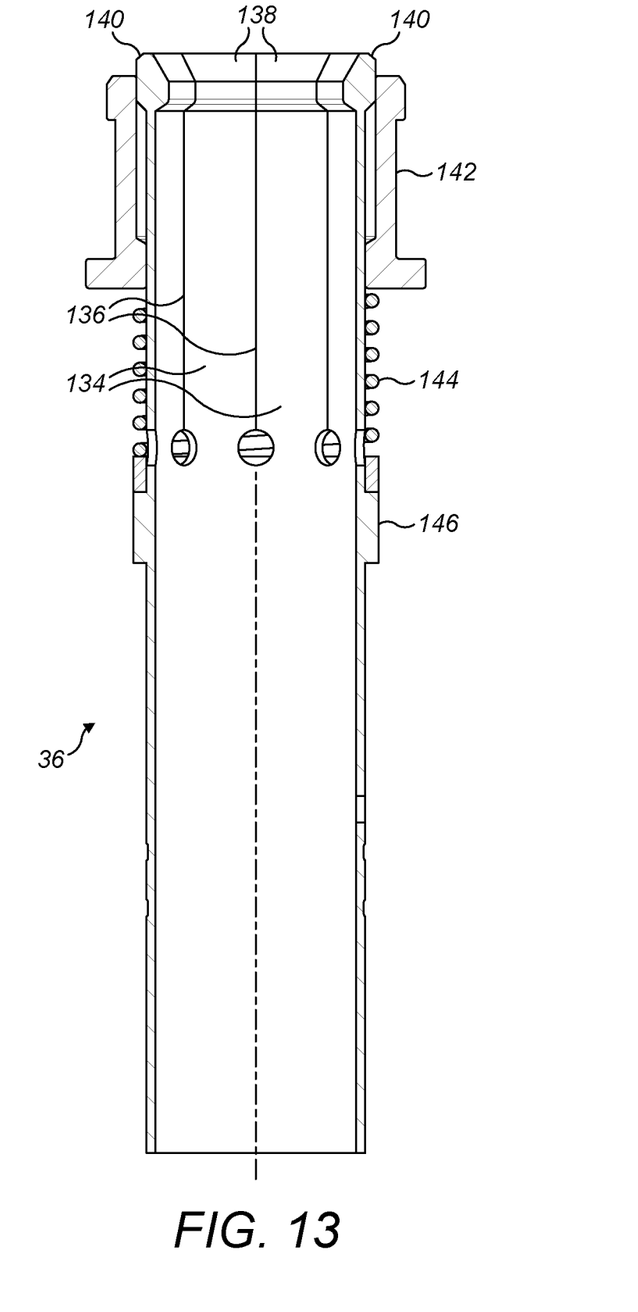
FIG. 13 is a side view of an anchor collet of the pulling system shown in FIGS. 6 and 7.

Turning finally to FIG. 13, this illustrates in detail the tubular anchor collet 36 that is shown surrounding the pulling rod 34 under the lower flange attachments 28 in FIGS. 6 and 7. The anchor collet 36 has some features in common with the locking collet 108 described above.

The anchor collet 36 can engage and disengage the pulling rod 34 by virtue of radially-movable, longitudinally-extending fingers 134 at one end of the anchor collet 36. That end of the anchor collet 36 is divided by longitudinally-extending, circumferentially-spaced slits 136 to form the fingers 134. Each finger 134 has, at its distal end, a radially-inwardly-facing tooth 138 and a radially-outwardly-projecting cam formation 140. The teeth 138 can move radially by virtue of resilient radial deflection of the fingers 134.

Radially-outward deflection of the fingers 134 is either blocked or enabled by a locking collar 142 that encircles the anchor collet 36, depending upon the longitudinal position of the locking collar 142 with respect to the anchor collet 36. The locking collar 142 is movable longitudinally along the anchor collet 36 between a distal locked position and a proximal unlocked position. In the locked position, the locking collar 142 bears against the cam formations 140 of the fingers 134. Thus, the teeth 138 are held closed together to engage in gaps 62 between links 46 of the pulling rod 34.

Tension in the pulling rod 34 pulls the distal end of the anchor collet 36 into engagement with a seat formation 82 on the lower side of a lower flange attachment 28, as seen in FIGS. 7 and 11. The teeth 138 are held closed together by the surrounding seat formation 82 in addition to the locking collar 142.

The locking collar 142 is biased distally into the locked position, upwardly in this illustration, by a spring 144 that acts axially between the locking collar 142 and a circumferential ring 146 that encircles the anchor collet 36. The spring 144 forces the locking collar 142 against the cam formations 140 to hold the teeth 138 closed together around the pulling rod 34. As the anchor collet 36 bears against the lower side of a lower flange attachment 28, the pulling rod 34 cannot move upwardly relative to the lower flange attachment 28.

When the locking collar 142 is pulled down against the bias of the spring 144 into the unlocked position, this frees the cam formations 140 to move radially outwardly so that the teeth 138 can open apart to disengage the pulling rod 34. This allows the pulling rod 34 to be released from the lower flange attachment 28 on disassembly of the pulling system 24.

The invention claimed is:

1. A pulling and alignment system for flanged components, the system comprising:
   at least one pair of flange attachments adapted to be fixed to respective flanges of the components that are to be pulled together and aligned for coupling;
   a puller device supported by at least one of the flange attachments of the pair; and
   a flexible elongate pulling link extending between the flange attachments of the or each pair, the pulling link being engaged by, and movable relative to, the puller device to act in tension between those flange attachments;
   wherein the pulling link is an articulated rod comprising a longitudinal series of rigid elements and ball-and-socket couplings between adjacent elements of the series, such that, each of those elements are pivotably coupled to at least one other of those elements, and
   wherein the puller device engages longitudinally-spaced recesses between adjacent elements of the series.

2. The system of claim 1, comprising limiting formations for limiting relative pivotal movement between adjacent elements of the series.

3. The system of claim 1, wherein each flange attachment is a flange extension that comprises:
   a mounting adapted to fix the flange attachment to one of the flanges; and an arm cantilevered from the mounting to extend beyond said one of the flanges and to hold the pulling link outwardly of said one of the flanges.

4. The system of claim 3, wherein the mounting comprises at least one spigot arranged to extend into a bolt hole of said one of the flanges.

5. The system of claim 4, wherein the or each spigot is radially expandable within the bolt hole for engagement with said one of the flanges.

6. The system of claim 4, wherein the or each spigot extends transversely with respect to the arm.

7. The system of claim 3, wherein the pulling link extends through an opening in the arm of at least one flange attachment of a pair of said at least one pair of flange attachments, the opening being located distally with respect to the mounting.

8. The system of claim 7, wherein the mounting comprises at least one spigot arranged to extend into a bolt hole of said one of the flanges.

9. The system of claim 8, wherein the or each spigot is radially expandable within the bolt hole for engagement with said one of the flanges.

10. The system of claim 8, wherein the or each spigot extends transversely with respect to the arm.

11. The system of claim 8, wherein the opening extends in a direction substantially parallel to the or each spigot.

12. The system of claim 1, wherein the pulling link is flexible in three dimensions.

13. The system of claim 1, wherein the puller device is supported by a first flange attachment of a pair of said at least one pair of flange attachments and the pulling link is fixed relative to a second flange attachment of that pair.

14. The system of claim 13, comprising a removably attachable anchor part acting between the pulling link and the second flange attachment.

15. The system of claim 14, wherein the anchor part bears against a side of the second flange attachment that faces away from the first flange attachment.

16. The system of claim 1, further comprising a spacer part positioned between, and bearing against, the flange attachments to limit convergence between the flange attachments.

17. The system of claim 1, wherein the puller device comprises a ratchet mechanism movable reciprocally along the pulling link, the ratchet mechanism comprising teeth that are movable radially to engage and pull the pulling link during an advance stroke and to release the pulling link during a return stroke.

18. The system of claim 17, wherein the puller device further comprises a unidirectional lock having radially-movable pawls to engage and hold the pulling link during the return stroke of the ratchet mechanism.

19. The system of claim 1, comprising at least two pairs of flange attachments, each with at least one respective puller device and pulling link.

20. The system of claim 19, further comprising a power supply and control system capable of actuating the puller devices independently of each other.

21. The system of claim 19, wherein the components are pipes, the flanges extend radially from the pipes and the pairs of flange attachments are distributed angularly around central longitudinal axes of the pipes.

22. The system of claim 21, comprising at least three pairs of flange attachments, each with at least one respective puller device and pulling link.

23. The system of claim 1, wherein the flange attachments are fixed temporarily to fixing holes provided in the respective flanges, the fixing holes being usable subsequently to receive fastenings that couple the flanges together.

24. The system of claim 23, wherein the flange attachments occupy fewer fixing holes than are provided in the respective flanges, others of those fixing holes remaining unoccupied to receive fastenings that couple the flanges together.

25. The system of claim 24, comprising at least two flange attachments on each flange, wherein the unoccupied fixing holes are between those flange attachments.

26. A method of pulling together and aligning flanged components, the method comprising:
fixing flange attachments to respective flanges of the components as an opposed pair; and
tensioning a flexible elongate pulling link between the opposed pair of flange attachments by engaging longitudinally-spaced recesses of the pulling link, the pulling link being an articulated rod comprising a longitudinal series of rigid elements, at least one of those elements pivoting with respect to at least one other of those elements as the flanges are pulled together.

27. The method of claim 26, comprising limiting relative pivotal movement between adjacent elements of the series while pulling the flanges together.

28. The method of claim 26, comprising:
bending the pulling link along its length to accommodate misalignment between the flanges; and
straightening the pulling link under tension to correct the misalignment.

29. The method of claim 26, comprising bending the pulling link along its length in at least two mutually-transverse directions transverse to its length.

30. The method of claim 26, comprising limiting convergence between the flanges to maintain a gap between the flanges.

31. The method of claim 26, comprising:
coupling the flanges with fastenings while the flanges remain apart but aligned and substantially parallel;
removing the flange attachments and the pulling links; and
tightening the fastenings to bring the flanges together.

32. The method of claim 26, comprising fixing the flange attachments to fixing holes provided in the respective flanges and, after removing the flange attachments, coupling the flanges with fastenings received in those fixing holes.

* * * * *